US009491976B2

(12) United States Patent
Pierias et al.

(10) Patent No.: US 9,491,976 B2
(45) Date of Patent: Nov. 15, 2016

(54) HEATABLE GARMENT SYSTEMS

(71) Applicants: Deson Robert Pierias, Hamilton (CA); Alexander Steven Ross, Hamilton (CA)

(72) Inventors: Deson Robert Pierias, Hamilton (CA); Alexander Steven Ross, Hamilton (CA)

(73) Assignee: Deson Pierias (CA)

( * ) Notice: Subject to any disclaimer, the term of this patent is extended or adjusted under 35 U.S.C. 154(b) by 322 days.

(21) Appl. No.: 14/103,830

(22) Filed: Dec. 11, 2013

(65) Prior Publication Data

US 2015/0157065 A1 Jun. 11, 2015

(51) Int. Cl.
| | | |
|---|---|---|
| *A61F 7/03* | (2006.01) | |
| *A41D 13/005* | (2006.01) | |
| *F24J 1/00* | (2006.01) | |
| *A41D 19/015* | (2006.01) | |
| *A41B 11/00* | (2006.01) | |
| *A01K 13/00* | (2006.01) | |

(52) U.S. Cl.
CPC ......... *A41D 13/0051* (2013.01); *A01K 13/007* (2013.01); *A41B 11/005* (2013.01); *A41B 11/006* (2013.01); *A41D 19/015* (2013.01); *A41D 19/01535* (2013.01); *F24J 1/00* (2013.01); *A41D 13/0058* (2013.01)

(58) Field of Classification Search
CPC ........... A41D 13/0051; A41D 13/087; A41D 19/0086; A41D 19/01517; A41D 19/002; A41D 19/0024; A41D 19/0027; A41D 19/0031; A41D 19/0093
USPC .............. 206/233; 126/124; 2/163, 160, 159
See application file for complete search history.

(56) References Cited

U.S. PATENT DOCUMENTS

| | | | |
|---|---|---|---|
| 2,555,203 A | | 5/1951 | Ramsey |
| 2,792,827 A | | 5/1957 | Gravin et al. |
| 3,187,987 A | * | 6/1965 | Langdon ................ B65D 75/14 206/223 |
| 4,535,482 A | | 8/1985 | Spector et al. |
| 4,587,672 A | | 5/1986 | Madnick et al. |
| 5,035,003 A | * | 7/1991 | Rinehart .......... A41D 19/01535 2/159 |
| 5,084,986 A | * | 2/1992 | Usui ........................ A61F 7/03 126/204 |
| 6,141,801 A | * | 11/2000 | Helenick .......... A41D 19/01535 2/159 |
| 7,002,104 B2 | | 2/2006 | Gilligan et al. |
| 7,537,577 B2 | | 5/2009 | Phelan et al. |
| 2007/0106352 A1 | * | 5/2007 | Carstens ............ A41D 13/1161 607/112 |
| 2009/0229035 A1 | * | 9/2009 | Van Hale ............. A41D 19/002 2/161.6 |
| 2010/0089897 A1 | * | 4/2010 | Bart .................... A41D 13/0051 219/211 |
| 2010/0095947 A1 | | 4/2010 | Gellis |
| 2011/0041229 A1 | * | 2/2011 | Niemi ................ A41D 13/0051 2/69 |

* cited by examiner

Primary Examiner — King M Chu
(74) Attorney, Agent, or Firm — Steven M. Greenberg; CRGO Law

(57) ABSTRACT

Garment systems include complete, independently wearable garments like gloves, socks, scarves, earmuffs, headbands, hats and the like having attached thereto one or more single-use, air-activated exothermic heating packs sealed in a substantially airtight envelope, which can be opened when it is time for use. Thus, according to embodiments described herein, a user can simply open a package and put on the garment(s), and the exothermic heating pack(s) will be automatically activated by exposure to air, without the user having to place a heating pack inside a special pocket or the garment or fit a heating pack to their body before putting on the garment. The garments can be discarded after use for disposal or recycling.

7 Claims, 12 Drawing Sheets

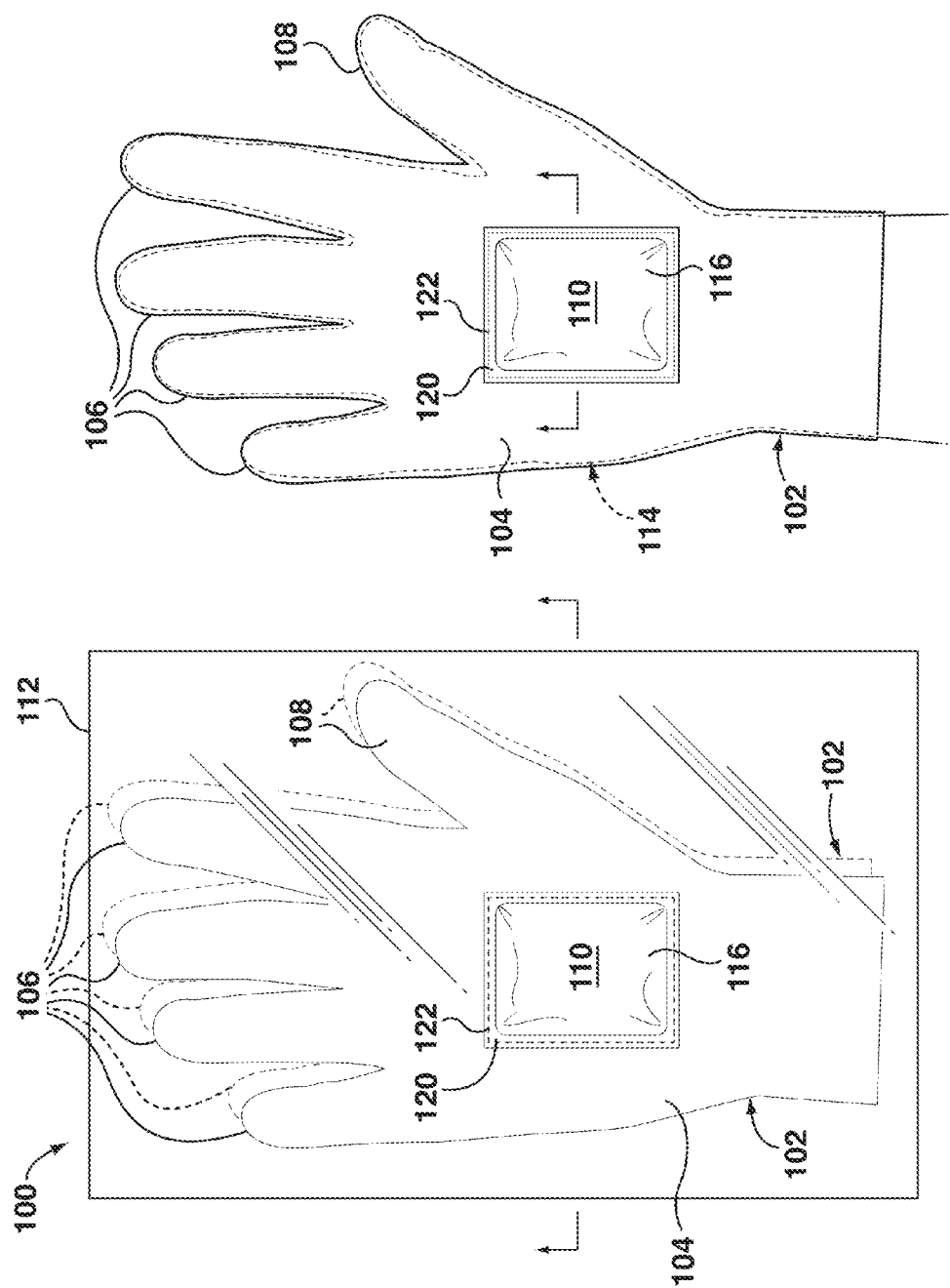

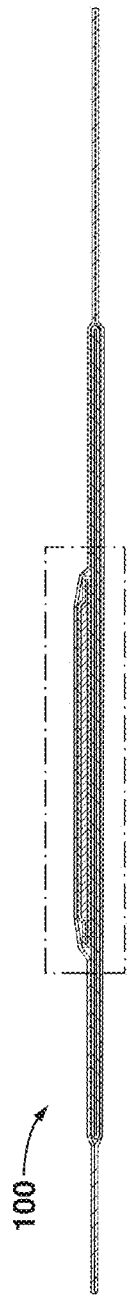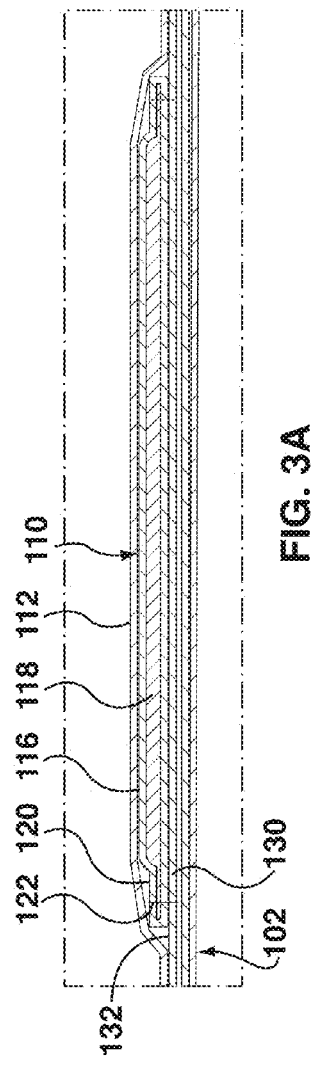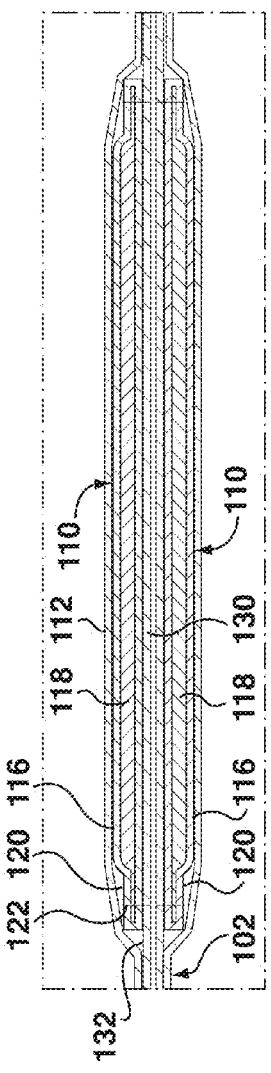

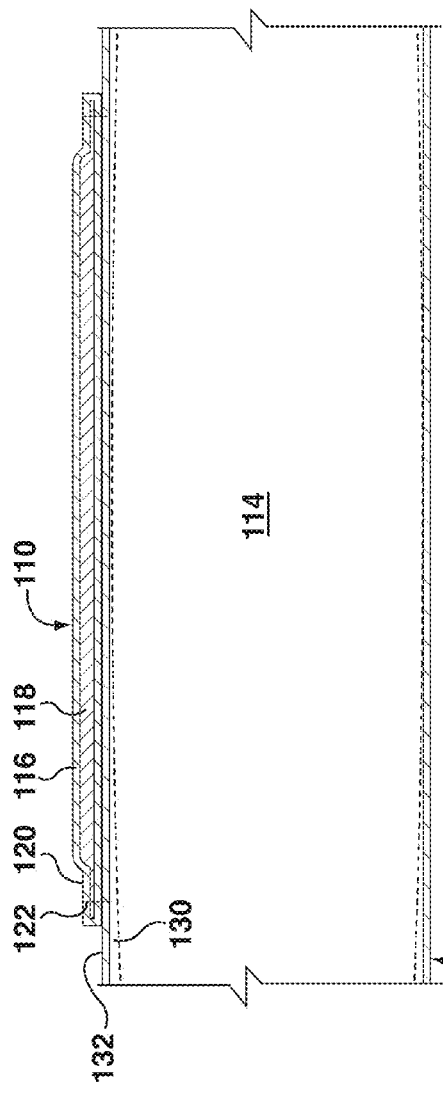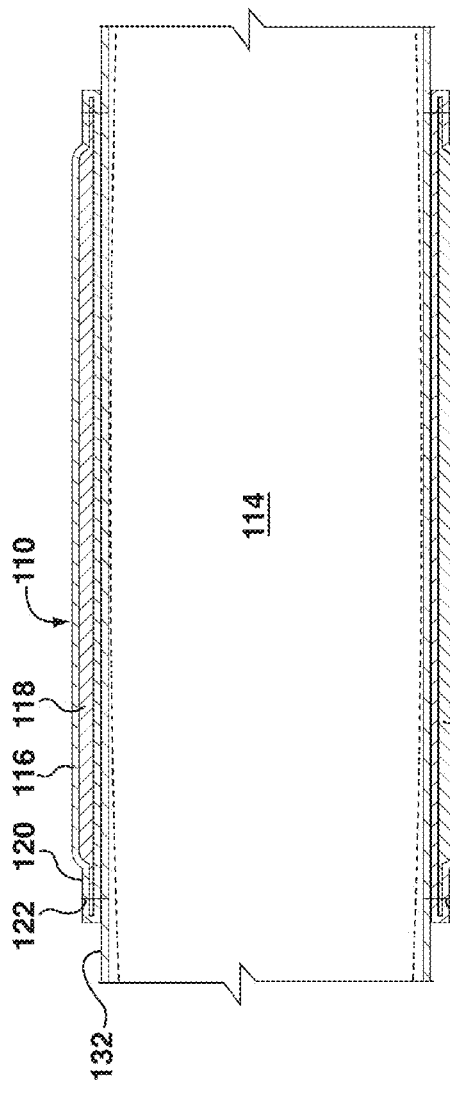

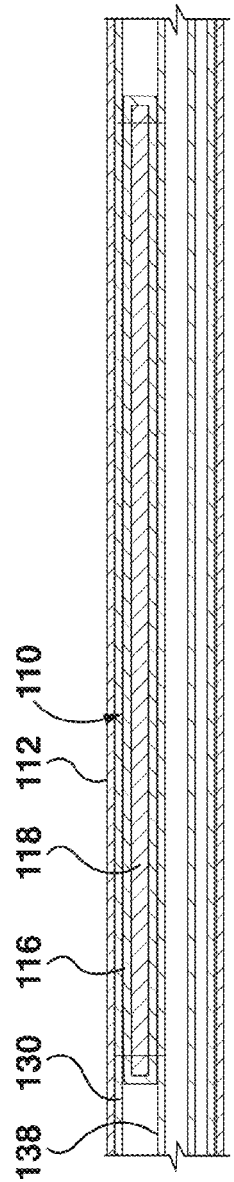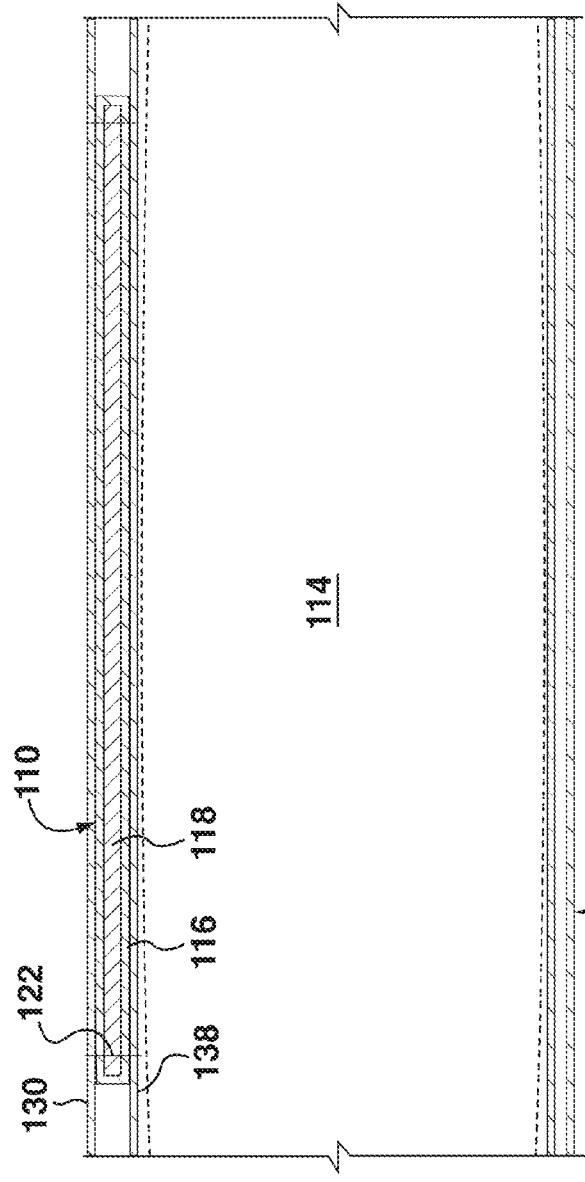

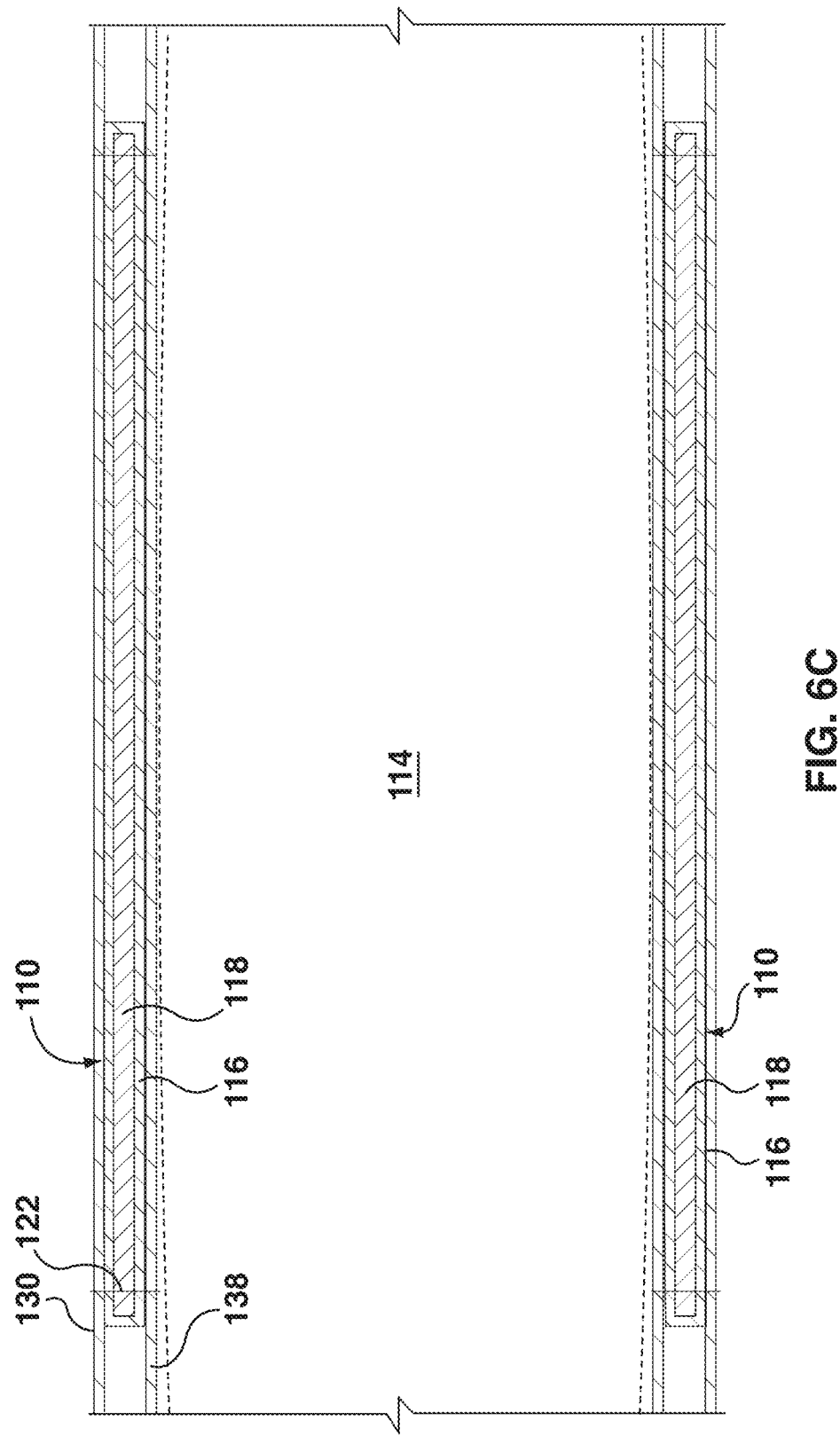

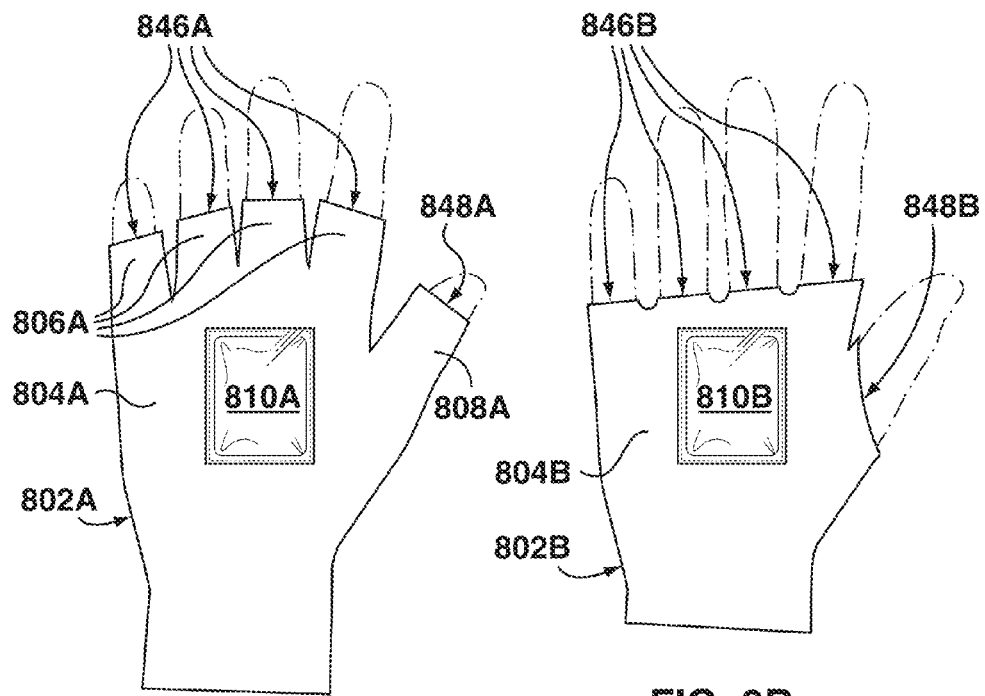
FIG. 8A
FIG. 8B
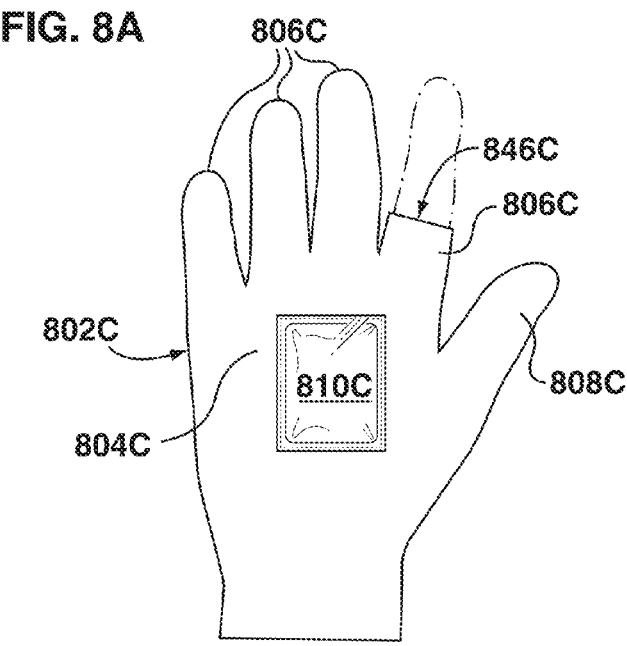
FIG. 8C

HEATABLE GARMENT SYSTEMS

TECHNICAL FIELD

The present invention relates to garments, and more particularly to heatable garment systems.

BACKGROUND

It has long been known to protect parts of the body against cold by covering them with garments to provide insulation. For example, in the case of humans, the hands may be covered with mitts or gloves, the feet may be covered with socks and boots, the neck and face may be covered with a scarf, and the ears may be covered with earmuffs, a headband or a hat. The paws of domestic animals may be similarly covered, and pet dogs are often outfitted with boots adapted to their paws to protect against snow and cold during winter walks.

It is also known to use exothermic heating packs in combination with garments such as mitts and gloves. Exothermic heating packs utilize an exothermic chemical reaction to release heat, and can be placed inside a garment such as a glove to heat the body part inside. Some garments such as gloves include special pockets for receiving exothermic heating packs. Exothermic heating packs may be either reusable or of the single-use type.

One type of reusable exothermic heating pack relies on the exothermic crystallization of supersaturated solutions, which is initiated by using a small metal disk to generate nucleation and begin crystallization. Sodium acetate is typically used as the supersaturated solution. By heating the exothermic heating pack after use (e.g. in hot water) until the contents are fluid and then letting it cool, it can be "recharged" for reuse.

One type of single-use exothermic heating pack, referred to herein as an "iron oxidation heating pack", contains cellulose, iron, vermiculite, water, activated carbon and salt in a porous container. The vermiculite serves as a water reservoir, the activated carbon assists in even heat distribution, and the salt acts as a catalyst. This type of exothermic heating pack is air-activated and, when it is exposed to air, heat is generated by the exothermic oxidation of the iron. These exothermic heating packs are therefore sold in airtight packages and opened when heat is desired.

Examples of gloves which may be used with exothermic heating packs include those taught by U.S. Pat. No. 2,792,827 to Gravin et al., U.S. Pat. No. 4,587,672 to Madnick et al., U.S. Pat. No. 5,035,003 to Rinehart and U.S. Patent Application Publication No. 2010/0095947 in the name of Gellis. Gellis also teaches an exothermic heating pack having a partial hand shape that can be held to the hand by way of caps that receive a user's fingertips and thumbtip and a strap extending across the palm, or by way of a catch that allows the user's fingers to be inserted between the catch and the heating element.

SUMMARY

Garment systems include garments like gloves, socks, scarves, earmuffs, headbands, hats and the like having attached thereto one or more single-use, air-activated exothermic heating packs sealed in a substantially airtight envelope, which can be opened when it is time for use. Thus, according to embodiments described herein, a user can simply open a package and put on the garment(s), and the exothermic heating pack(s) will be automatically activated by exposure to air, without the user having to place a heating pack inside a special pocket or the garment or fit a heating pack to their body before putting on the garment. The garments can be discarded after use for disposal or recycling.

A heatable glove system comprises at least one glove, at least one single-use, air-activated exothermic heating pack secured to each glove, and at least one substantially airtight envelope surrounding at least the exothermic heating pack(s). The glove(s) may include finger-receiving portions and a thumb-receiving portion, or may include finger apertures and a thumb aperture.

In one embodiment, a single substantially airtight wrapper surrounds the entirety of each glove, and in one preferred embodiment a single substantially airtight wrapper entirely surrounds a pair of gloves. In another embodiment, a substantially airtight envelope surrounds the exothermic heating pack(s) while leaving a substantial portion of the respective glove exposed.

In one embodiment, each exothermic heating pack is disposed between layers of the respective glove, in another embodiment each exothermic heating pack is disposed on an exterior surface of its respective glove and in yet another embodiment each exothermic heating pack is disposed on an interior surface of its respective glove.

A heatable sock system comprises at least one sock, at least one single-use, air-activated exothermic heating pack secured to each sock, and at least one substantially airtight envelope surrounding at least the exothermic heating pack(s).

In one embodiment, a single substantially airtight wrapper surrounds the entirety of each sock. A single substantially airtight wrapper may surround a pair of socks, or a set of four socks, for example for use with domestic animals such as dogs. In another embodiment, a substantially airtight envelope surrounds the exothermic heating pack(s) while leaving a substantial portion of the respective sock exposed.

More generally, a heatable garment system comprises at least one complete, independently wearable garment, at least one single-use, air-activated exothermic heating pack secured to each garment, and at least one substantially airtight envelope surrounding at least the exothermic heating pack(s). The garment(s) may be selected from the group comprising gloves, socks, scarves, earmuffs, headbands and hats. In one embodiment, a single substantially airtight wrapper surrounds the entire garment or garments.

BRIEF DESCRIPTION OF THE DRAWINGS

These and other features will become more apparent from the following description in which reference is made to the appended drawings wherein:

FIG. 1 shows a first exemplary heatable glove system;

FIG. 2 shows a glove from the glove system of FIG. 1 on a user's hand;

FIGS. 3, 3A and 3B show a first exemplary cross-sectional structure for the heatable glove system of FIG. 1;

FIGS. 4, 4A and 4B show a second exemplary cross-sectional structure for the heatable glove system of FIG. 1;

FIGS. 6A and 6B show a fourth exemplary cross-sectional structure for the heatable glove system of FIG. 1;

FIG. 6C shows a fifth exemplary cross-sectional structure for the heatable glove system of FIG. 1;

FIGS. 8A to 8C each show a glove having an exothermic heating pack;

DETAILED DESCRIPTION

Figure 5A:
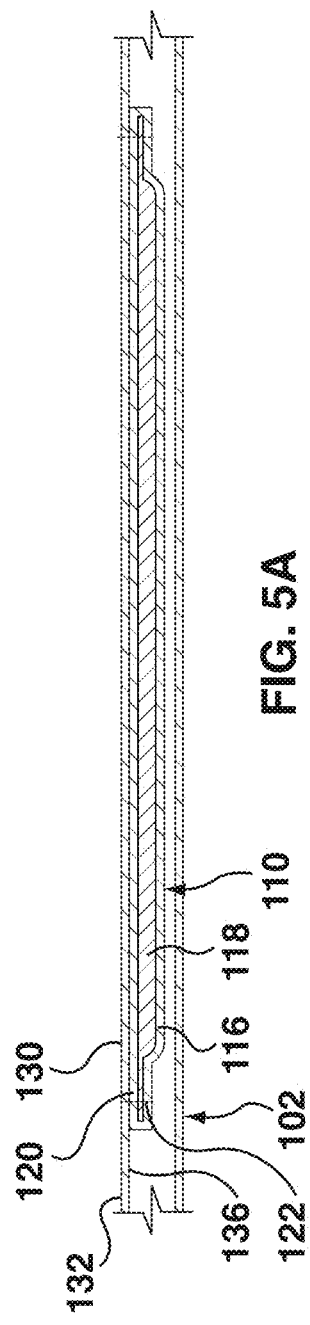
FIGS. 5A and 5B show a third exemplary cross-sectional structure for the heatable glove system of FIG. 1.

Reference is now made to FIG. 1, which shows a first exemplary heatable glove system, indicated generally by the reference numeral 100. The heatable glove system 100 comprises one or more gloves 102. As used herein, the term "glove" refers to a hand covering that forms a cavity for receiving the metacarpus and the carpus of a human hand so as to envelop substantially all of the metacarpus and the carpus. As such, a "glove", as that term is used herein, may be a conventional glove that includes finger-receiving portions and a thumb-receiving portion that receive and envelop the fingers and thumb, respectively, or may be a fingerless glove that includes finger apertures and a thumb aperture. Moreover, a "glove", as that term is used herein, may include partial finger-receiving portions and/or a partial thumb-receiving portion, and may have full or partial finger-receiving portions for some but not all fingers. The exemplary gloves 102 shown in FIG. 1 each include a main portion 104 for receiving the metacarpus and the carpus of a human hand as well as finger-receiving portions 106 and a thumb-receiving portion 108.

The gloves 102 may be formed from any suitable material, and preferably, although not necessarily, include one or more layers of textile material. In some embodiments the gloves 102 may be formed entirely or substantially entirely from textile materials; in other embodiments the gloves 102 may be formed from a combination of textile and non-textile materials. For example, the gloves 102 may have one or more inner textile layers to provide warmth and one or more rubber or polymer outer layers to provide grip enhancement and/or water resistance. The gloves 102 may be fitted gloves, that is, fitted to either the right hand or the left hand, or may be ambidextrous gloves that will fit either hand. The gloves 102 are preferably made of sufficiently low cost material to accommodate disposal after a single use.

Each of the gloves 102 in the heatable glove system 100 has one or more single-use, air-activated exothermic heating packs 110 secured thereto. Preferably, the exothermic heating packs 110 are iron oxidation heating packs. Because the exothermic heating packs 110 are air-activated, each exothermic heating pack 110 is surrounded by a substantially airtight envelope, preferably forming a vacuum seal.

In the exemplary heatable glove system 100 shown in FIG. 1, a single substantially airtight wrapper 112 surrounds the entire glove 102 to form a package. In some embodiments, each wrapper 112 contains only a single glove 102; in other embodiments the wrapper may entirely surround two gloves 102, as indicated by the second glove 102 shown in dashed lines in FIG. 1. With the glove(s) 102 and the exothermic heating pack(s) 110 surrounded by the substantially airtight wrapper 112, the exothermic reaction is arrested. When a user wishes to wear the glove(s) 102, he or she would open the wrapper 112, remove the glove(s) 102 and place the glove(s) 102 on his or her hand(s) 114, as shown in FIG. 2. With the wrapper 112 removed, the exothermic heating pack(s) 110 will be exposed to air and the exothermic heating process will begin. The wrapper 112 may be made from any suitable material, including multi-layer materials.

The exothermic heating pack(s) 110 may be secured to the glove(s) 102 using any suitable technique. In the exemplary heatable glove system 100 shown in FIG. 1, each exothermic heating pack 110 comprises an air-permeable packet 116 containing the exothermic and related materials 118 (see FIGS. 3A and 4A to 6C) and having a peripheral flange 120. The exothermic heating pack 110 is secured to the glove 102 by stitching 122 along the peripheral flange 120; in other embodiments the exothermic heating pack(s) 110 may be secured to the glove(s) 102 by way of suitable adhesive.

Reference is now made to FIGS. 3 and 3A, which show a first exemplary cross-sectional structure for the heatable glove system 100 shown in FIG. 1. In this exemplary structure, the glove 102 is an ambidextrous glove formed from a single textile layer 130, and a single exothermic heating pack 110 is disposed on an exterior surface 132 of the glove 102. FIGS. 4 and 4A show a second exemplary cross-sectional structure for the heatable glove system 100 shown in FIG. 1 which is similar to the structure shown in FIGS. 3 and 3A except that it comprises two exothermic heating packs 110, with the exothermic heating packs 110 disposed on opposed exterior surfaces 132 of the glove 102. FIGS. 3B and 4B show cross-sectional views of the of the exemplary structure shown in FIGS. 3 and 3A and 4 and 4A, respectively, with a hand 114 inside the glove 102. Anatomical details of the hand 114 are omitted for simplicity of illustration.

Figure 5B:
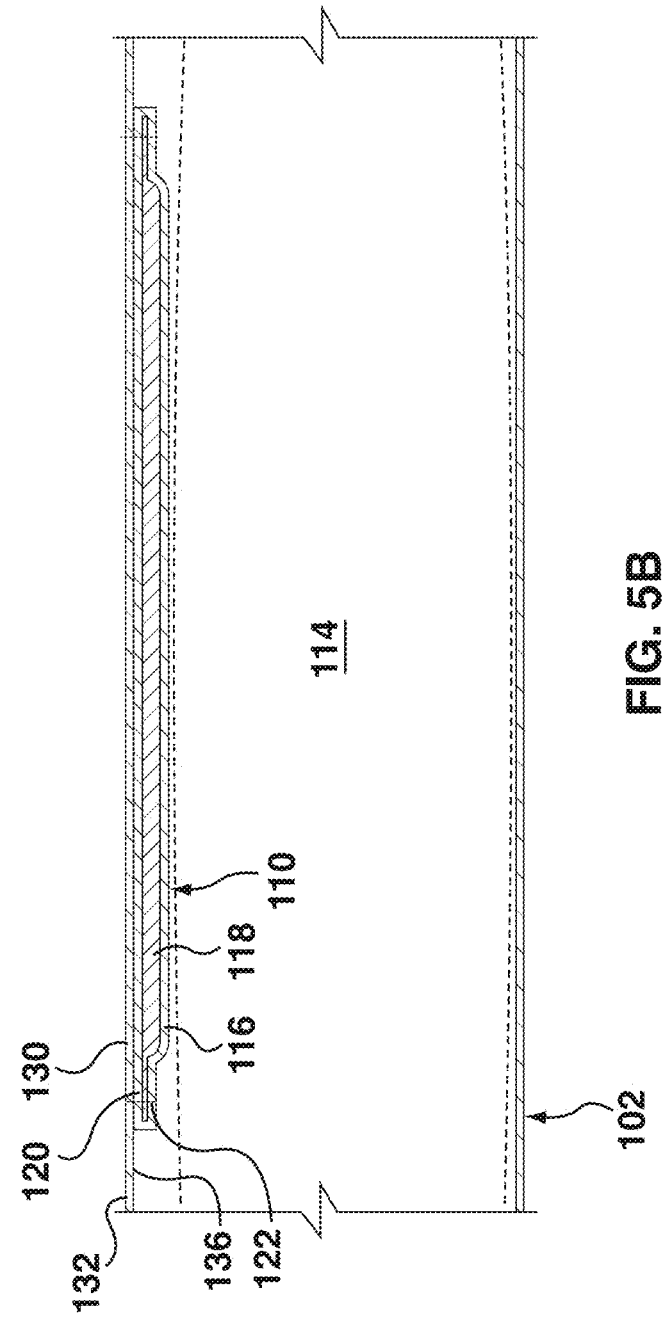

FIG. 5A shows a third exemplary cross-sectional structure for the heatable glove system 100 shown in FIG. 1. The third exemplary cross-sectional structure shown in FIG. 5A is similar to the first exemplary cross-sectional structure shown in FIGS. 3, 3A and 3B, except that the single exothermic heating pack 110 is disposed on an interior surface 136 of the glove 102. FIG. 5B shows a cross-sectional view of the exemplary structure shown in FIG. 5A with a hand 114 (anatomical details omitted) inside the glove 102. Optionally, two exothermic heating packs 110 may be disposed on opposed interior surfaces 136 of the glove 102, analogously to the structure shown in FIGS. 4 and 4A, or one exothermic heating pack may be disposed on an interior surface and another exothermic heating pack may be disposed on an exterior surface.

Reference is now made to FIGS. 6A and 6B, which show a fourth exemplary cross-sectional structure for the heatable glove system 100 shown in FIG. 1. In the fourth exemplary structure, the glove 102 is an ambidextrous glove formed from two textile layers 130, 138 and a single exothermic heating pack 110 is disposed between the two textile layers 130, 138 and held in place by stitching 122. FIG. 6B shows a cross-sectional view of the sixth exemplary structure with a hand 114, whose anatomical details are omitted for simplicity, inside the glove 102. In some embodiments, as shown in FIG. 6C, two opposed exothermic heating packs 110 may be disposed between the two textile layers 130, 138.

Figure 7:
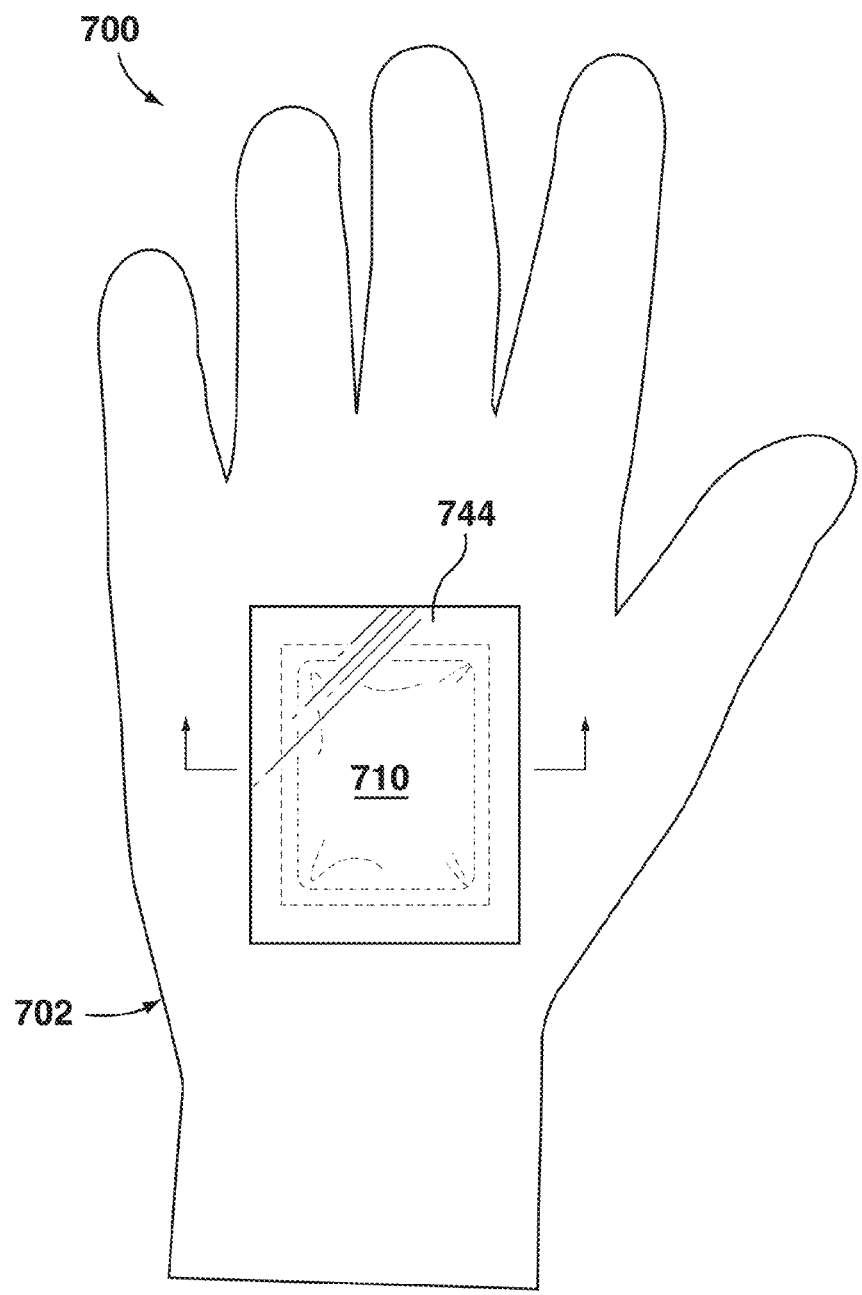
FIGS. 7 and 7A show a second exemplary heatable glove system.
Figure 7A:
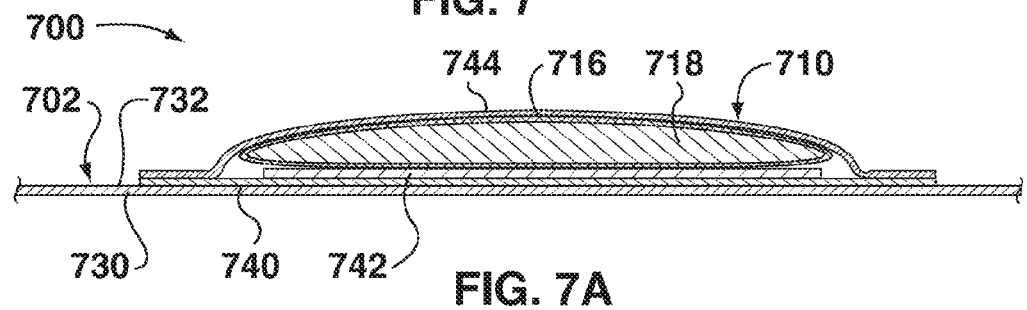

In the exemplary embodiments described thus far, a single substantially airtight wrapper 112 surrounds the entire glove 102 to form a package. Reference is now made to FIGS. 7 and 7A, which show a second exemplary embodiment of a heatable glove system 702. The heatable glove system 702 shown in FIGS. 7 and 7A is similar to the heatable glove system 100 shown in FIGS. 1 to 6C, with corresponding reference numerals referring to corresponding features but with the prefix "7" instead of "1". The heatable glove system 702 shown in FIGS. 7 and 7A differs from the heatable glove system 100 shown in FIGS. 1 to 6C in that a substantially airtight envelope surrounds the exothermic heating pack 710 while leaving a substantial portion of the glove 702 exposed.

In particular, as seen in the cross-sectional view in FIG. 7A, the glove 702 is an ambidextrous glove formed from a single textile layer 730, and an exothermic heating pack 710 is secured to the exterior of the glove 702. A substantially airtight backing layer 740 is disposed on an exterior surface 732 of the glove 702, and the exothermic heating pack 710, which comprises an air-permeable packet 716 containing the exothermic and related materials 718, is secured to the backing layer 740 by a layer of suitable adhesive 742. A substantially airtight sealing layer 744 extends over the exothermic heating pack 710 and is sealed to the backing layer 740, so that the sealing layer 744 and the backing layer 740 cooperate to form a substantially airtight envelope surrounding the exothermic heating pack 710. The glove 702 may feature, for example, a single exothermic heating pack 710, or more than one exothermic heating pack 710, such as by securing two exothermic heating packs 710 to opposed exterior surfaces 732 of the glove 702. With the exothermic heating pack(s) 710 isolated from surrounding air by the sealing layer 744 and the backing layer 740, the exothermic reaction is arrested. A user wishing to wear the glove(s) 702 and use the heating feature thereof would peel or tear the sealing layer(s) 744 away from the backing layer 740, either before or after placing the glove on his or her hand(s). With the sealing layer 744 removed, the exothermic heating pack(s) 710 will be exposed to air and the exothermic heating process will begin. The sealing layer 744 and the backing layer 740 may be made from any suitable material, and may be secured to one another by any suitable technique. The terms "sealing layer" and "backing layer" do not imply a monolayer structure, and may be provided for example, by suitable multilayer films.

The exemplary gloves shown in FIGS. 1 to 7A are conventional gloves that include finger-receiving portions and a thumb-receiving portion that receive and envelop the fingers and thumb, respectively. The teachings of the present disclosure may be applied to other types of glove as well. For example, FIGS. 8A to 8C each show a glove 802A, 802B, 802C having an exothermic heating pack 810A, 810B, 810C. The glove 802A in FIG. 8A includes a main portion 804A, four partial finger-receiving portions 806A terminating at finger apertures 846A and a partial thumb-receiving portion 808A terminating at a thumb aperture 848A. FIG. 8B shows a glove 802B which includes only a main portion 804B with four finger apertures 846B and a thumb aperture 848B but no finger-receiving portion or thumb-receiving portion. The glove 802C in FIG. 8C includes a main portion 804C, three full finger-receiving portions 806C and a partial finger-receiving portion 806 for the index finger, terminating at a finger aperture 846C, as well as a thumb-receiving portion 808C.

The teachings of the present disclosure are not limited to gloves, and may be applied to other garments, such as socks, scarves, earmuffs, headbands and hats.

Figure 9A:
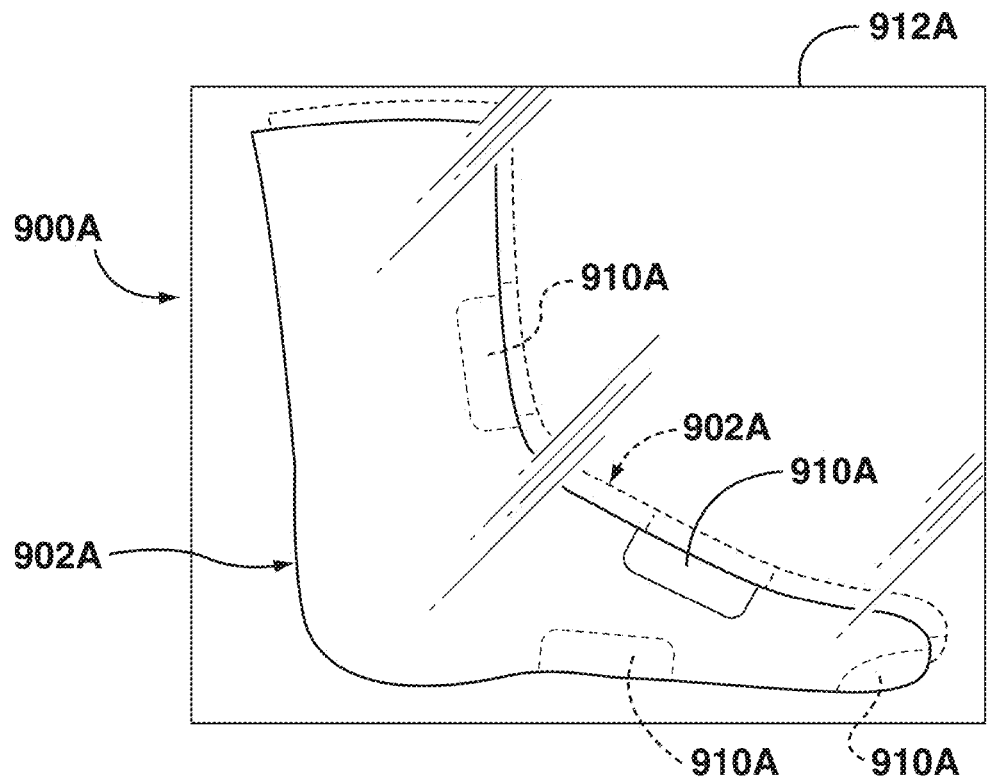
FIGS. 9A and 9B show first and second exemplary heatable sock systems, respectively.
Figure 9B:
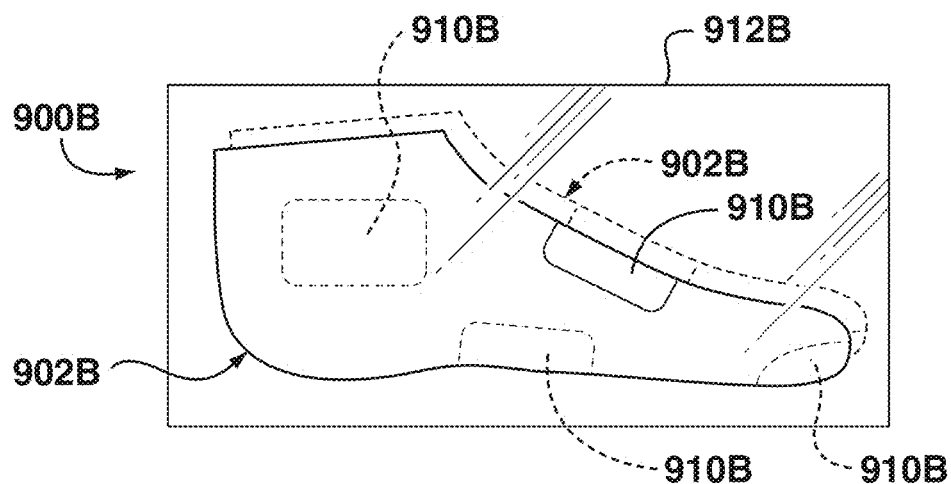

FIGS. 9A and 9B show exemplary heatable sock systems 900A, 900B, respectively, each comprising one or more socks 902A, 902B and one or more single-use, air-activated exothermic heating packs 910A, 910B secured to each sock 902A, 902B. The socks 902A, 902B are preferably formed from single-layer or multi-layer textile materials, and the exothermic heating packs 910A, 910B are preferably iron oxidation heating packs. At least the exothermic heating packs 910A, 910B and are surrounded by a substantially airtight envelope. In the exemplary embodiments shown in FIGS. 9A and 9B, the socks 902A, 902B are each entirely surrounded by a substantially airtight wrapper 912A, 912B. For example, one wrapper 912A, 912B may contain one or two socks 902A, 902B. In other embodiments, analogously to the glove system shown in FIGS. 7 and 7A, a substantially airtight envelope may surround the exothermic heating pack(s) while leaving a substantial portion of the sock exposed. As can be seen from the dashed lines in FIGS. 9A and 9B, one or more than one exothermic heating pack 910A, 910B may be secured to the sock(s) 902A, 902B and the exothermic heating pack(s) 910A, 910B may be secured at any desired position(s) on the sock 902A, 902B. The exothermic heating pack(s) 910A, 910B may be secured to an exterior surface of the sock 902A, 902B using the structure shown in FIGS. 3 to 4B, to an interior surface of the sock 902A, 902B using the structure shown in FIGS. 5A and 5B, or between layers of the sock 902A, 902B using the structure shown in FIGS. 6A and 6B or FIG. 6C.

Figure 10:
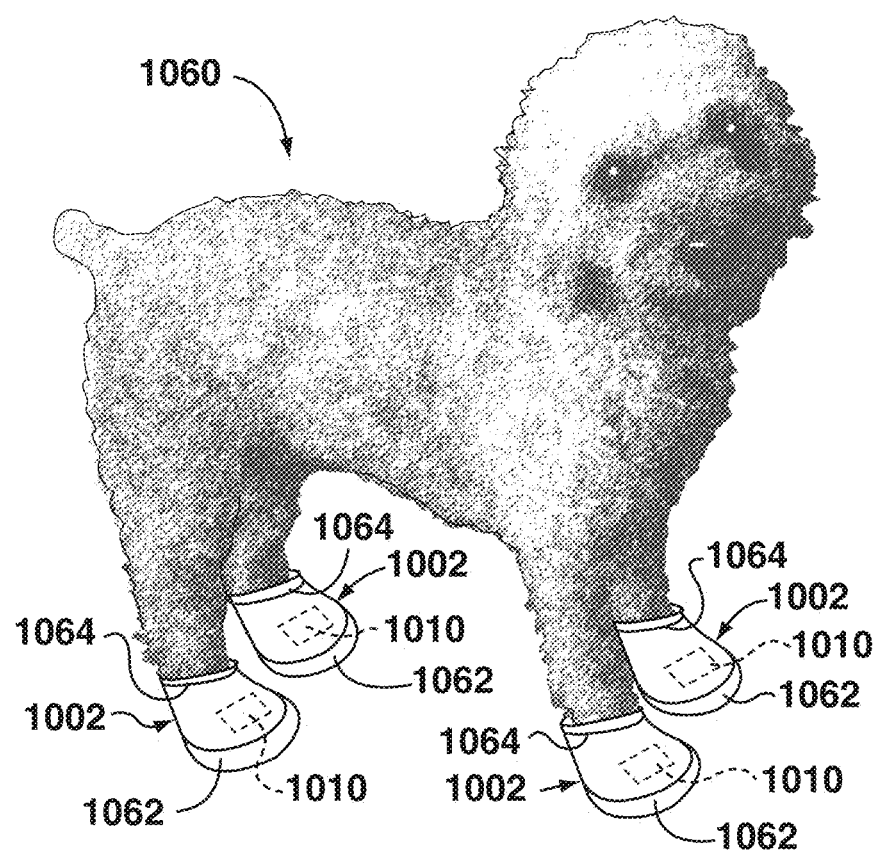
FIG. 10 shows four socks, each having an exothermic heating pack secured thereto, on the feet of an exemplary dog.
Figure 11:
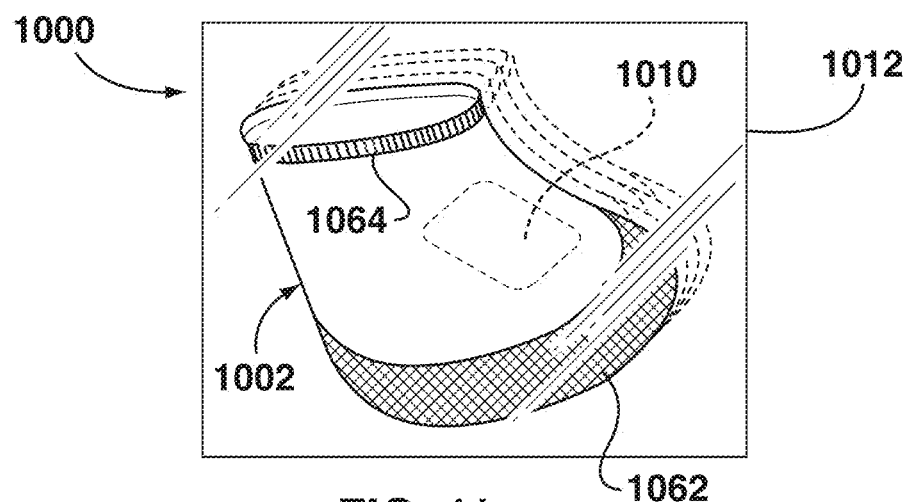
FIG. 11 shows a third exemplary heatable sock system.

The present disclosure, as applied to socks, is not limited to socks for human beings, and may also be applied to socks for animals, including domestic animals such as dogs and cats, among others. FIG. 10 shows four socks 1002, each having an exothermic heating pack 1010 secured thereto, on the feet of an exemplary dog 1060. In the illustrated embodiment, the exemplary dog 1060 is a cocker spaniel/poodle mix named "Coffee"; the exemplary socks 1002 may be used with any suitable dog. FIG. 11 shows a heated sock system 1000 comprising four socks 1002 contained within a single substantially airtight wrapper 1012. To render them suitable for use with domestic animals in an outdoor environment, the socks 1002 include a padded underside portion 1062 and an elasticized cuff 1064. Preferably the socks 1002, or at least the underside portions 1062 thereof, are waterproof or water-resistant. The exothermic heating packs 1010 should be selected to avoid overheating the feet of the animal with which the socks 1002 will be used.

Figures 12, 13:
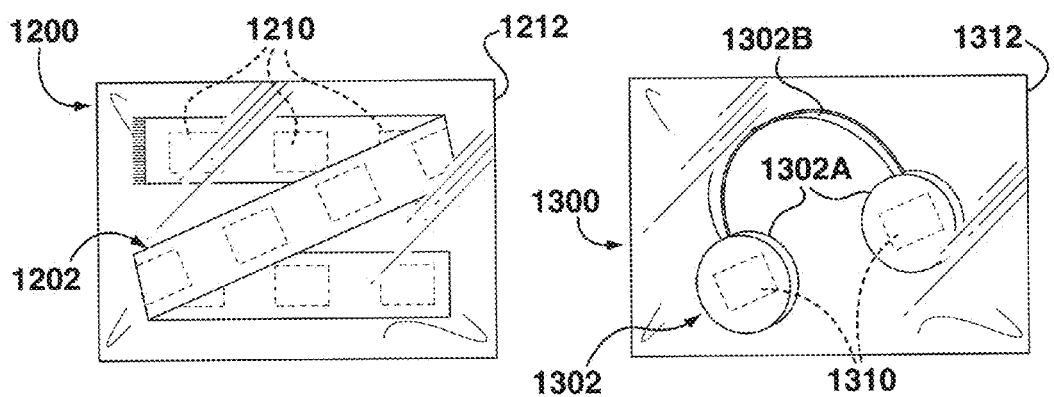
FIG. 12 shows an exemplary heatable scarf system.
FIG. 13 shows an exemplary heatable earmuff system.

FIG. 12 shows an exemplary heatable scarf system 1200 comprising a scarf 1202 and one or more single-use, air-activated exothermic heating pack(s) 1210 secured to the scarf 1202, which may be formed from single-layer or multi-layer textile materials. In the embodiment shown in FIG. 12, the scarf 1202 and the exothermic heating packs 1210 are entirely surrounded by a substantially airtight wrapper 1212; in other embodiments, a substantially airtight envelope may surround the exothermic heating pack(s) while leaving a substantial portion of the scarf exposed. The exothermic heating pack(s) 1210 may be secured at any desired position on the scarf 1202 using any suitable structure.

Referring now to FIG. 13, an exemplary heatable earmuff system is indicated generally by the reference 1300, and comprises earmuffs 1302 to which are secured single-use, air-activated exothermic heating packs 1310. The earmuffs 1302 comprise opposed muff portions 1302A joined to a headband 1302B, with the exothermic heating packs 1310 secured to the muff portions 1302A. The earmuffs 1302 and the exothermic heating packs 1310 are entirely surrounded by a substantially airtight wrapper 1312 although in other embodiments only the muff portions, or only the exothermic heating packs, are surrounded by substantially airtight wrappers. Any suitable structure may be used to secure the exothermic heating packs 1310 to the muff portions 1302A.

Figures 14, 15:
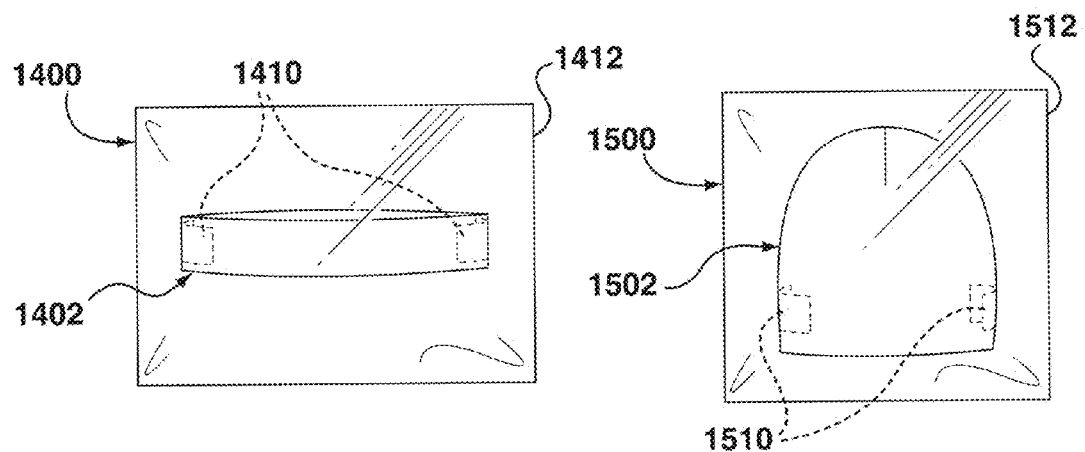
FIG. 14 shows an exemplary heatable headband system.
FIG. 15 shows an exemplary heatable hat system.

FIG. 14 shows an exemplary heatable headband system 1400 comprising a headband 1402 and one or more single-use, air-activated exothermic heating pack(s) 1410 secured to the headband 1402. The exothermic heating pack(s) 1410 may be secured at any desired position on the headband 1402 using any suitable structure; preferably two exothermic heating packs 1410 are disposed at roughly diametrically opposed positions so as to be aligned with the ears when the headband 1402 is worn. The headband 1402 may be formed, for example, from single-layer or multi-layer textile materials, and may be elasticized for improved fit. In the embodiment shown in FIG. 14, the headband 1402 and the exothermic heating packs 1410 are entirely surrounded by a substantially airtight wrapper 1412. Other embodiments may have a substantially airtight envelope surrounding the exothermic heating pack(s) while leaving a substantial portion of the headband exposed. The present disclosure also contemplates other types of body bands, in addition to headbands, such as bands for the neck, thigh, bicep, and so on.

Referring now to FIG. 15, an exemplary heatable hat system is indicated generally by reference 1500 and comprises a hat 1502 and one or more single-use, air-activated exothermic heating pack(s) 1510 secured to the hat 1502. The exothermic heating pack(s) 1510 may be secured at any desired position on the hat 1502 using any suitable structure; as with the headband 1402 shown in FIG. 14, preferably two exothermic heating packs 1510 are disposed at roughly diametrically opposed positions so as to be aligned with the ears when the hat 1502 is worn. In the illustrated embodiment, the hat 1502 and the exothermic heating packs 1510 are entirely surrounded by a substantially airtight wrapper 1512, whereas in other embodiments a substantially airtight envelope may surround the exothermic heating pack(s) while leaving a substantial portion of the hat exposed.

The teachings of the present disclosure may be generalized beyond gloves, socks, scarves, earmuffs, headbands and hats to a wide range of garments. It should be noted here that each garment forming part of a heatable garment system as described herein is a complete, independently wearable garment that is separate and distinct from the exothermic heating pack(s) secured to the garment(s) to form, in combination with at least one substantially airtight envelope, the claimed system. The exothermic heating pack(s) are additional to the garments, and do not form any part of the garments themselves, such that the garments could be worn in exactly the same way even if the exothermic heating pack(s) were not present. Thus, the exothermic heating pack(s) are not necessary to the integrity or wearability of the garments. For example, each of the gloves described and illustrated herein is a complete, wearable glove, independent of the exothermic heating pack(s). Thus, the garments are characterized in that the garments are, alone, complete, integral and wearable independently of other components of the heatable garment system such as the exothermic heating pack(s) and the substantially airtight wrapper(s).

Although shown as generally rectangular for ease of illustration, the exothermic heating pads may be of any suitable shape. For example, the exothermic heating pads may trace the shape of all or part of a hand, such as the fingers, or all or part of a foot, such as the toes.

Thus, according to embodiments described herein, a user can simply open a package and put on the garment(s) contained therein, and the exothermic heating pack(s) will be automatically activated by exposure to air, without the user having to fuss with placing a heating pack inside a pocket, or fitting a heating pack to their body before putting on the garment.

Once the exothermic heating pack(s) have been exhausted after a single use, the garments may be discarded, either for disposal or recycling, for example by replacing the exhausted exothermic heating pack(s) with fresh exothermic heating pack(s) and sealing them, either in a wrapper or between a backing layer and sealing layer.

Figure 16:
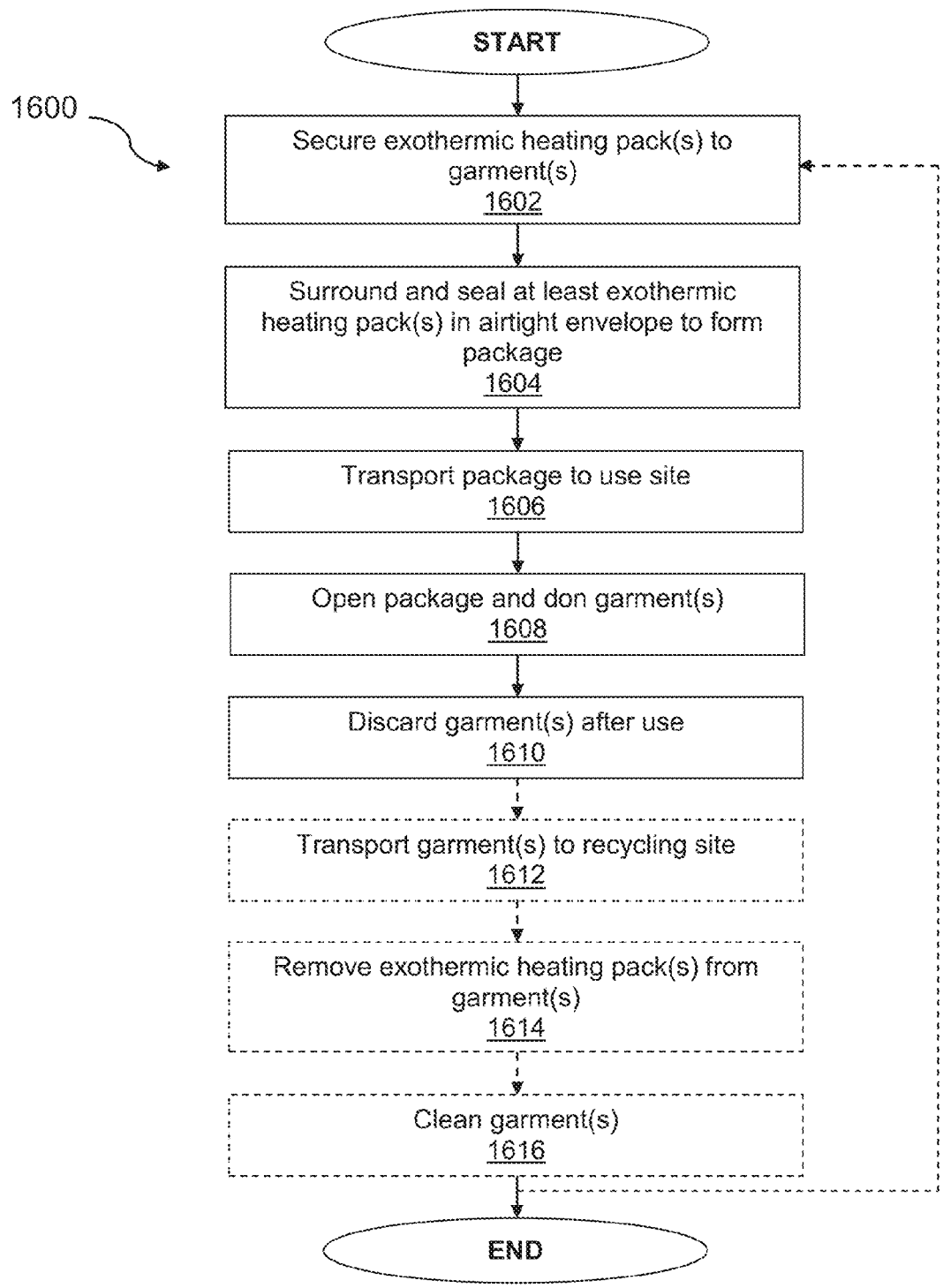
FIG. 16 is a flow chart showing an exemplary method for manufacturing a heatable garment.

Referring now to FIG. 16, an exemplary method for manufacturing a heatable garment is indicated generally at 1600. At step 1602, one or more single-use, exothermic heating packs are secured to one or more garments, and at step 1604, at least the exothermic heating pack(s) are surrounded and sealed within a substantially airtight envelope to form a package. Steps 1602 and 1604 are preferably performed in an anaerobic or substantially anaerobic environment to inhibit reaction in the exothermic heating pack(s) before sealing. The substantially airtight envelope may surround only the exothermic heating pack, or may surround the entire garment or may surround a set of garments. At step 1606, the package is transported to a use site where the garment(s) will be used. Transportation to the use site may be direct, or may be indirect, for example from a manufacturer to a distributor to a retailer to a user who transports the package to the use site. At step 1608, at the use site, a user opens the package and dons the garment(s), and at step 1610 the user discards the garment(s) after use. At optional step 1612, the garments are transported to a recycling site at which the exothermic heating pack(s) are removed from the garment(s) at step 1614 and the garment(s) may optionally be cleaned at step 1616; removal of the exothermic heating pack(s) and cleaning may occur at the same site or at different sites. The method 1600 may then return to step 1602 so that the garment can be recycled by securing one or more new exothermic heating packs thereto. Alternatively, the method may end after step 1610, either after the first iteration or after a sufficient number of iterations that the garment(s) can no longer be recycled.

Various embodiments have been described by way of example. It will be apparent to persons skilled in the art that a number of variations and modifications can be made without departing from the scope of the claims.

What is claimed is:

1. A heatable glove system, comprising:
   glove;
   at least one single-use, air-activated exothermic heating pack secured to the glove; and
   at least one substantially airtight envelope surrounding each exothermic heating pack;
   wherein:
   each substantially airtight envelope surrounds the respective exothermic heating pack while leaving a substantial portion of the glove exposed to air; and
   each substantially airtight envelope and each respective exothermic heating pack is secured to an exterior face of the glove.

2. The heatable glove system of claim 1, wherein the glove includes finger-receiving portions and a thumb-receiving portion.

3. The heatable glove system of claim 1, wherein the glove includes finger apertures and a thumb aperture.

4. A heatable garment system, comprising:
   complete, independently wearable garment;
   at least one single-use, air-activated exothermic heating pack secured to each garment; and at least one substantially airtight envelope surrounding each exothermic heating pack;

wherein:

each substantially airtight envelope surrounds the respective exothermic heating pack while leaving a substantial portion of the garment exposed to air; and each substantially airtight envelope and each respective exothermic heating pack is secured to an exterior face of the garment.

5. The heatable garment system of claim 4, wherein the at least one garment is selected from the group consisting of gloves, socks, scarves, earmuffs, headbands and hats.

6. The heatable sock system of claim 5, wherein:

the at least one sock comprises two socks; and the single substantially airtight wrapper entirely surrounds both socks.

7. The heatable sock system of claim 5, wherein:

the at least one sock comprises four socks; and the single substantially airtight wrapper entirely surrounds all four socks.

\* \* \* \* \*